United States Patent
Jiang

(10) Patent No.: US 11,330,509 B2
(45) Date of Patent: May 10, 2022

(54) METHOD AND APPARATUS FOR STOPPING SYSTEM INFORMATION REQUEST, USER EQUIPMENT AND BASE STATION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 63 days.

(21) Appl. No.: 16/979,437

(22) PCT Filed: Mar. 16, 2018

(86) PCT No.: PCT/CN2018/079337
§ 371 (c)(1),
(2) Date: Sep. 9, 2020

(87) PCT Pub. No.: WO2019/174047
PCT Pub. Date: Sep. 19, 2019

(65) Prior Publication Data
US 2021/0007043 A1    Jan. 7, 2021

(51) Int. Cl.
*H04W 48/14* (2009.01)
*H04W 48/10* (2009.01)
(Continued)

(52) U.S. Cl.
CPC ........... *H04W 48/14* (2013.01); *H04W 48/10* (2013.01); *H04W 74/0833* (2013.01); *H04W 76/27* (2018.02); *H04W 80/02* (2013.01)

(58) Field of Classification Search
None
See application file for complete search history.

(56) References Cited

U.S. PATENT DOCUMENTS

2018/0220288 A1* 8/2018 Agiwal ................. H04W 8/005
2018/0279377 A1* 9/2018 Lin ................... H04W 72/0406

FOREIGN PATENT DOCUMENTS

CN    101500282 A    8/2009
CN    102595555 A    7/2012
(Continued)

OTHER PUBLICATIONS

Huawei et al. Further Considerations of "Other SI", 3GPP TSG-RAN2 Meeting #96, R2-167580, Reno, Nevada, Nov. 14-18, 2016, 6 pages.
(Continued)

*Primary Examiner* — Hong S Cho
(74) *Attorney, Agent, or Firm* — Finnegan, Henderson, Farabow, Garrett & Dunner, L.L.P.

(57) ABSTRACT

The present disclosure relates to a method and an apparatus for stopping an SI request, user equipment, a base station, and a computer readable storage medium. The method for stopping an SI request includes: if a first system information block (SIB1) indicates that an SI to be acquired by a UE is not being broadcast, sending an SI request to the base station by means of a first message (MSG1) or a third message (MSG3); during waiting for the base station to return an SI response, if an updated SIB1 is acquired and the updated SIB1 indicates that the requested SI is being broadcast, stopping the SI request procedure. In the embodiments of the present disclosure, the SI request can be terminated in advance, thereby reducing wasted UE power consumption and avoiding unnecessary operations.

15 Claims, 6 Drawing Sheets

---

Transmitting an SI request to a base station through a first message (MSG1) or a third message (MSG3), in response to an SIB1 indicating that SI to be acquired by the UE is not being broadcast — S101

Stopping an SI request procedure, in response to an updated SIB1 being acquired while waiting for the base station to return an SI response and the updated SIB1 indicating that SI requested by the SI request is being broadcast — S102

(51) Int. Cl.
*H04W 74/08* (2009.01)
*H04W 76/27* (2018.01)
*H04W 80/02* (2009.01)

(56) References Cited

FOREIGN PATENT DOCUMENTS

| | | |
|---|---|---|
| CN | 107431887 A | 12/2017 |
| CN | 107708179 A | 2/2018 |
| WO | WO 2018/012894 A1 | 1/2018 |

OTHER PUBLICATIONS

Samsung. On Demand SI: Remaining Issues, 3GPP TSG-RAN WG2 #99, R2-1707678, Berlin, Germany, Aug. 21-25, 2017, 6 pages.
International Search Report in International Application No. PCT/CN2018/079337, dated Aug. 8, 2018.
English translation of the Written Opinion of the International Search Authority in the International Application No. PCT/CN2018/079337, dated Aug. 8, 2018.
First Office Action of the Chinese Application No. 201880000282.1, dated Mar. 25, 2019.

\* cited by examiner

METHOD AND APPARATUS FOR STOPPING SYSTEM INFORMATION REQUEST, USER EQUIPMENT AND BASE STATION

CROSS REFERENCE TO RELATED APPLICATIONS

This application is a national phase application based on International Application No. PCT/CN2018/079337, filed Mar. 16, 2018, the content of which is incorporated herein by reference.

TECHNICAL FIELD

The disclosure relates to the technical field of communication, and particularly, to a method and device for stopping a system information (SI) request, user equipment, a base station and a computer-readable storage medium.

BACKGROUND

In the 5th Generation (5G) mobile communication technology, system information can be divided into the first type of system information and the second type of system information. The first type of system information at least includes a master information block (MIB) and a system information block (SIB) 1. For the first type of system information, user equipment (UE) does not need to request, and a base station transmits the first type of system information to the UE by broadcasting. For the second type of system information, the base station will indicate, in SI scheduling information in the SIB1, whether each piece of SI except the SIB1 is being broadcast currently. If the SI is being broadcast, the UE may directly acquire the broadcast SI. If the SI is not being broadcast, the UE in an idle state or an inactive state may transmit an SI request through a message (MSG) 1 or an MSG3. After receiving the SI request, the base station transmits a response message to the UE through an MSG2 or an MSG4. After receiving the response message transmitted by the base station, the UE receives the SI after an SI window for the requested SI comes.

In this way, after transmitting the SI request, the UE needs to firstly receive the response message returned by the base station and then receive the SI in the SI window for the requested SI. However, while waiting for the base station to return the response message, if the UE receives an updated SIB1 indicating that the requested SI is being broadcast, the UE continues to wait for receiving the response message returned by the base station, which will waste UE power consumption and may have unnecessary operations.

SUMMARY

Based on the above, the present disclosure discloses a method and device for stopping an SI request, user equipment, a base station and a computer-readable storage medium to terminate an SI request in advance, thereby reducing wasted UE power consumption and avoiding unnecessary operations.

According to a first aspect of the embodiments of the disclosure, there is provided a method for stopping a system information (SI) request. The method is applied to UE and includes that:

an SI request is transmitted to a base station through a first message (MSG1) or a third message (MSG3), in response to a first system information block (SIB1) indicating that SI to be acquired by the UE is not being broadcast; and an SI request procedure is stopped, in response to an updated SIB1 being acquired while waiting for the base station to return an SI response and the updated SIB1 indicating that SI requested by the SI request is being broadcast.

In an embodiment, the method may further include that:

it is determined, before stopping the SI request procedure, that an SI window corresponding to the requested SI exists before an end time of a current SI modification period.

In an embodiment, the SI request procedure is stopped in response to the updated SIB1 indicating that the requested SI is being broadcast includes that:

the SI request procedure is stopped in response to the updated SIB1 indicating that all requested SI is being broadcast.

In an embodiment, it is determined that the SI window corresponding to the requested SI exists before the end time of the current SI modification period includes that:

it is determined that SI windows corresponding to all requested SI exist within the current SI modification period.

In an embodiment, the SI request procedure is stopped includes that:

indication information is transmitted, by a Radio Resource Control (RRC) layer, to a Media Access Control (MAC) layer, wherein the indication information is configured to indicate the MAC layer to stop a random access which is initiated according to the SI request; and the MAC layer stops receiving of a second message (MSG2) or a fourth message (MSG4) according to the indication information and stops the random access which is initiated according to the SI request.

In an embodiment, the SI request procedure is stopped includes that:

indication information is transmitted, by an RRC layer, to an MAC layer, wherein the indication information is configured to indicate the MAC layer to end a random access which is initiated according to the SI request; and the MAC layer waits to receive a MSG2 or a MSG4 according to the indication information, and in response to failing to receive the MSG2 or the MSG4 for the UE, the SI request is not retransmitted through the MSG1 or the MSG3.

According to a second aspect of the embodiments of the disclosure, there is provided a method for stopping an SI request. The method is applied to a base station and includes that:

an SI request transmitted by UE through a first message (MSG1) or a third message (MSG3) is received;

a second message (MSG2) is transmitted in a window corresponding to the MSG2 or a fourth message (MSG4) is transmitted in a window corresponding to the MSG4, to return an SI response to the UE; and when a target parameter including the window meets a preset condition, the MSG2 or the MSG4 is stopped from being transmitted and the broadcast state corresponding to SI, requested by the UE, in the SIB1 is set to being broadcast.

In an embodiment, the target parameter including the window meets the preset condition includes that:

the window includes a transmitting occasion of the SIB1, and change in content of the SIB1 is allowed at the transmitting occasion; or the window includes a transmitting occasion of the SIB1, change in the content of the SIB1 is allowed at the transmitting occasion, and an SI window corresponding to the requested SI exists within the current SI modification period.

According to a third aspect of the embodiments of the disclosure, there is provided a device for stopping an SI request. The device is applied to UE and includes:

a transmitting module configured to transmit an SI request to a base station through a first message (MSG1) or a third message (MSG3), in response to a first system information block (SIB1) indicating that SI to be acquired by the UE is not being broadcast; and a stopping module configured to stop an SI request procedure, in response to an updated SIB1 being acquired while waiting for the base station to return an SI response corresponding to the SI request transmitted by the transmitting module and the updated SIB1 indicating that SI requested by the SI request is being broadcast.

In an embodiment, the device may further include:

a determination module configured to determine, before the stopping module stops the SI request procedure, that an SI window corresponding to the requested SI exists before an end time of a current SI modification period.

In an embodiment, the stopping module is configured to:

stop the SI request procedure in response to the updated SIB1 indicating that all requested SI is being broadcast.

In an embodiment, the determination module is configured to:

determine that SI windows corresponding to all requested SI exist within the current SI modification period.

In an embodiment, the stopping module includes:

a first transmitting sub-module configured to transmit indication information to a Media Access Control (MAC) layer, wherein the indication information is configured to indicate the MAC layer to stop a random access which is initiated according to the SI request; and a first stopping sub-module configured to stop receiving of a second message (MSG2) or a fourth message (MSG4) according to the indication information which is transmitted by the first transmitting sub-module, and stop the random access which is initiated according to the SI request.

In an embodiment, the stopping module includes:

a second transmitting sub-module configured to transmit indication information to an MAC layer, wherein the indication information is configured to indicate the MAC layer to end a random access which is initiated according to the SI request; and a second stopping sub-module configured to wait to receive an MSG2 or an MSG4 according to the indication information which is transmitted by the second transmitting sub-module, and in response to failing to receive the MSG2 or the MSG4 for the current UE, not retransmit the SI request through the MSG1 or the MSG3.

According to a fourth aspect of the embodiments of the disclosure, there is provided a device for stopping an SI request. The device is applied to a base station and includes:

a receiving module configured to receive an SI request which is transmitted by UE through a first message (MSG1) or a third message (MSG3);

a transmitting module configured to transmit a second message (MSG2) in a window corresponding to the MSG2 or a fourth message (MSG4) in a window corresponding to the MSG4, to return an SI response corresponding to the SI request received by the receiving module to the UE; and a setting module configured to, when a target parameter including the window meets a preset condition, stop transmitting the MSG2 or the MSG4, and set the broadcast state corresponding to SI, requested by the UE, in the SIB1 to being broadcast.

In an embodiment, the target parameter including the window meets the preset condition includes:

the window including a transmitting occasion of the SIB1, and change in content of the SIB1 being allowed at the transmitting occasion; or the window including a transmitting occasion of the SIB1, change in the content of the SIB1 being allowed at the transmitting occasion, and an SI window corresponding to the requested SI existing within the current SI modification period.

According to a fifth aspect of the embodiments of the disclosure, there is provided UE. The UE may include:

a processor; and a memory configured to store instructions executable by the processor.

The processor is configured to:

transmit an SI request to a base station through a first message (MSG1) or a third message (MSG3), in response to a first system information block (SIB1) indicating that SI to be acquired by the UE is not being broadcast; and stop an SI request procedure, in response to an updated SIB1 being acquired while waiting for the base station to return an SI response and the updated SIB1 indicating that SI requested by the SI request is being broadcast.

According to a sixth aspect of the embodiments of the disclosure, there is provided a base station. The base station may include:

a processor; and a memory configured to store instructions executable by the processor.

The processor is configured to:

receive an SI request which is transmitted by UE through a first message (MSG1) or a third message (MSG3);

transmit a second message (MSG2) in a window corresponding to the MSG2 or a fourth message (MSG4) in a window corresponding to the MSG4, to return an SI response to the UE; and when a target parameter including the window meets the preset condition, stop transmitting the MSG2 or the MSG4, and set the broadcast state corresponding to SI, requested by the UE, in the SIB1 to being broadcast.

According to a seventh aspect of the embodiments of the disclosure, there is provided a computer-readable storage medium. Computer instructions are stored on the computer-readable storage medium. When the instructions are executed by a processor, the steps of the above method for stopping an SI request are implemented.

According to an eighth aspect of the embodiments of the disclosure, there is provided a computer-readable storage medium. Computer instructions are stored on the computer-readable storage medium. When the instructions are executed by a processor, the steps of the above method for stopping an SI request are implemented.

The technical solutions provided by the embodiments of the disclosure may have the following beneficial effects.

The SI request is transmitted to the base station through the MSG1 or the MSG3, if the SIB1 indicates that the SI to be acquired by the UE is not being broadcast. The SI request procedure is stopped, if an updated SIB1 is acquired while waiting for the base station to return an SI response and the updated SIB1 indicates that the SI requested by the SI request is being broadcast, so as to terminate the SI request in advance, thereby reducing wasted UE power consumption and avoiding unnecessary operations.

When the target parameter meets the preset condition, the MSG2 or the MSG4 is stopped from being transmitted, and the broadcast state corresponding to the SI requested by the UE in the SIB1 is set to being broadcast, so that the UE may know that the requested SI is being broadcast according to the SIB1, so as to terminate the SI request in advance, thereby reducing wasted UE power consumption and avoiding unnecessary operations.

It should be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementation models described in the following exemplary embodiments do not represent all implementation models consistent with the disclosure. On the contrary, they are merely examples of devices and methods consistent with some aspects of the disclosure as detailed in the appended claims.

Figure 1:
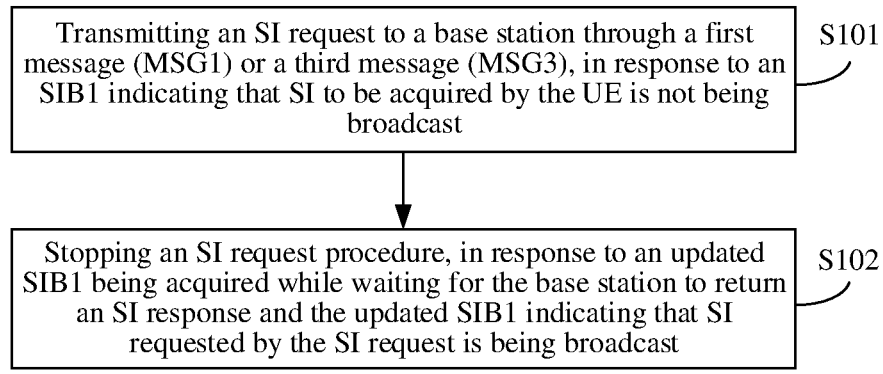
FIG. 1 is a flow diagram of a method for stopping an SI request according to an exemplary embodiment of the present disclosure.

FIG. 1 is a flow diagram of a method for stopping an SI request according to an exemplary embodiment of the present disclosure. The embodiment is described from the UE side. As illustrated in FIG. 1, the method for stopping an SI request includes the following:

In step S101, an SI request is transmitted to a base station through a first message (MSG1) or a third message (MSG3), in response to a first system information block (SIB1) indicating that the SI to be acquired by the UE is not being broadcast.

The base station broadcasts the first type of system information (Minimum SI), the Minimum SI includes an MIB and an SIB 1. The SIB1 indicates the scheduling information of other system information such as an SIB2, an SIB3 and an SIB4, and the scheduling information may include information which indicates whether each SI of other system information is being broadcast. The UE may acquire from the Minimum SI which SI is scheduled by the base station and whether the SI is being broadcast.

The SI request may be transmitted to the base station through the MSG1 or the MSG3, if the UE determines that the SI to be acquired by the UE is not being broadcast according to the indication of the SIB1.

In step S102, an SI request procedure is stopped, in response to an updated SIB1 being acquired while waiting for the base station to return an SI response and the updated SIB1 indicating that the SI requested by the SI request is being broadcast.

After transmitting the SI request to the base station through the MSG1 or the MSG3, the UE waits to receive an MSG2 or an MSG4. The SI request procedure is stopped, if an updated SIB1 is acquired while waiting to receive the MSG2 or the MSG4 and the updated SIB1 indicates that the SI requested by the SI request is being broadcast. Optionally, the SI request procedure is stopped, if the updated SIB1 indicates that all requested SI is being broadcast. The SI request procedure may be stopped in a plurality of manners, such as the following two manners.

In manner 1, an RRC layer transmits indication information to a MAC layer, and the indication information is configured to indicate the MAC layer to end the random access which is initiated according to the current SI request. The MAC layer stops receiving the MSG2 or the MSG4 according to the indication information and stops the random access which is initiated based on the SI request.

In the embodiment, the MAC layer stops receiving the MSG2 or the MSG4 according to the indication information, which is considered that the random access is completed.

In manner 2, an RRC layer transmits indication information to a MAC layer, and the indication information is configured to indicate the MAC layer to stop the random access which is initiated based on the SI request. The MAC layer waits to receive the MSG2 or the MSG4 according to the indication information, and when the MSG2 or the MSG4 for the current UE is not successfully received, the SI request is not retransmitted through the MSG1 or the MSG3.

In the embodiment, the MAC layer no longer retransmits the SI request through the MSG1 or the MSG3, if the MSG2 or the MSG4 for the current UE is not successfully received, which is considered that the random access process is completed.

It can be seen that in the embodiment, the SI request procedure may be stopped in a plurality of manners, and the implementation manners are flexible and diverse.

In addition, optionally, before stopping the SI request procedure, it is also necessary to determine that an SI window corresponding to the requested SI exists before the end time of the current SI modification period. For example, it is also necessary to determine that SI windows corresponding to all requested SI exist within the current SI modification period.

In the above embodiment, the SI request is transmitted to the base station through the MSG1 or the MSG3, if the SIB1 indicates that the SI to be acquired by the UE is not being broadcast. The SI request procedure is stopped, if an updated SIB1 is acquired while waiting for the base station to return an SI response and the updated SIB1 indicates that the requested SI is being broadcast, so as to terminate the SI request in advance, thereby reducing wasted UE power consumption and avoiding unnecessary operations.

Figure 2:
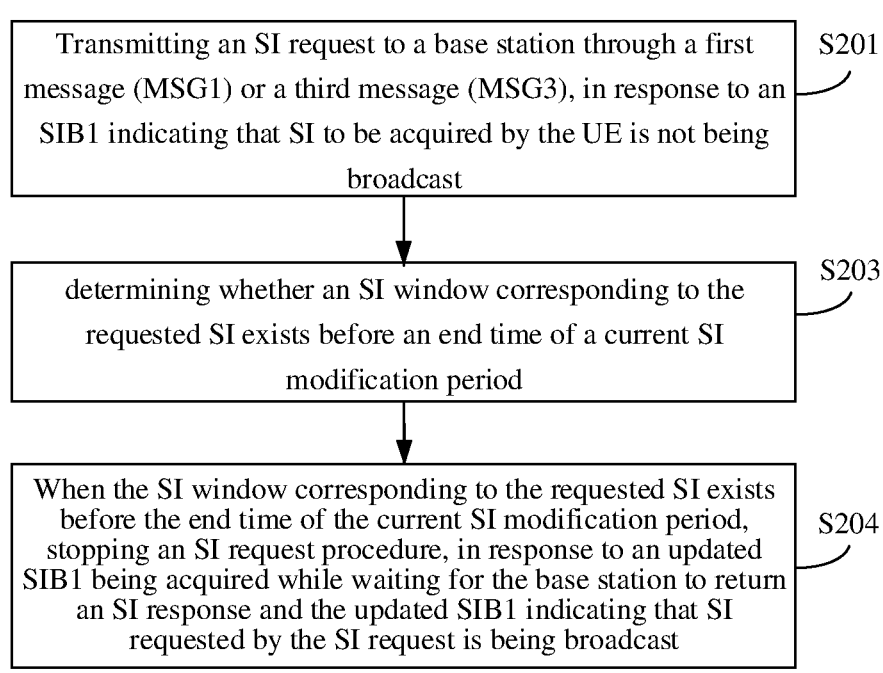
FIG. 2 is a flow diagram of another method for stopping an SI request according to an exemplary embodiment of the present disclosure.

FIG. 2 is a flow diagram of another method for stopping an SI request according to an exemplary embodiment of the present disclosure. As illustrated in FIG. 2, the method may include:

In step S201, an SI request is transmitted to a base station through a first message (MSG1) or a third message (MSG3), in response to an SIB1 indicating that the SI to be acquired by UE is not being broadcast.

In step S203, whether an SI window corresponding to the requested SI exists before the end time of the current SI modification period is determined.

In step S204, when the SI window corresponding to the requested SI exists, an SI request procedure is stopped, in response to an updated SIB1 being acquired while waiting for the base station to return an SI response and the updated SIB1 indicating that the SI requested by the SI request is being broadcast.

In the embodiment, the UE further determines whether the SI window corresponding to the requested SI exists before the end time of the current SI modification period. If the SI window exists, the SI request procedure is stopped.

In the above embodiment, whether the SI window corresponding to the requested SI exists before the end time of the current SI modification period is determined. When the SI window corresponding to the requested SI exists before the end time of the current SI modification period, the SI request procedure is stopped, if an updated SIB1 is acquired while waiting for the base station to return an SI response and the updated SIB1 indicates that the requested SI is being broadcast, so as to terminate the SI request in advance, thereby reducing wasted UE power consumption and avoiding unnecessary operations.

Figure 3:
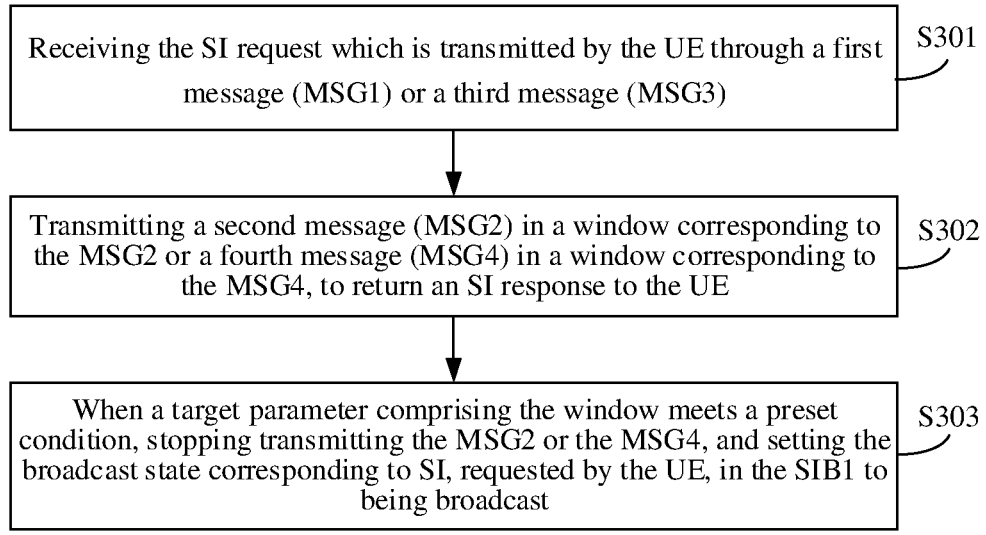
FIG. 3 is a flow diagram of a further method for stopping an SI request according to an exemplary embodiment of the present disclosure.

FIG. 3 is a flow diagram of a further method for stopping an SI request according to an exemplary embodiment of the present disclosure. The embodiment is described from the base station side. As illustrated in FIG. 3, the method includes:

In step S301, an SI request transmitted by UE through an MSG1 or an MSG3 is received.

In step S302, an MSG2 is transmitted in a window corresponding to the MSG2, or an MSG4 is transmitted in a window corresponding to the MSG4, to return an SI response to the UE.

In step S303, when the target parameter including the window meets the preset condition, the MSG2 or the MSG4 is stopped from being transmitted and the broadcast state corresponding to the SI, requested by the UE, in the SIB1 is set to being broadcast.

The target parameter may include, but is not limited to, the window corresponding to the MSG2 or the MSG4.

In the embodiment, the target parameter meets the preset condition may include that: the window corresponding to the MSG2 or the MSG4 includes a transmitting occasion of the SIB1, and change in the content of the SIB1 is allowed at the transmitting occasion. Or the target parameter meets the preset condition may include that: the window corresponding to the MSG2 or the MSG4 includes a transmitting occasion of the SIB1, change in the content of the SIB1 is allowed at the transmitting occasion, and an SI window corresponding to the requested SI exists within the current SI modification period.

In the embodiment, when the target parameter meets the preset condition, the base station may not transmit the MSG2 or the MSG4 for the above SI request, and directly sets the broadcast state corresponding to the SI, requested by the UE, in the SIB1 to being broadcast.

In the above embodiment, if the target parameter meets the preset condition, the MSG2 or the MSG4 is stopped from being transmitted, and the broadcast state corresponding to the SI requested by the UE in the SIB1 is set to being broadcast, so that the UE may know that the requested SI is being broadcast according to the SIB1, so as to terminate the SI request in advance, thereby reducing wasted UE power consumption and avoiding unnecessary operations.

Figure 4:
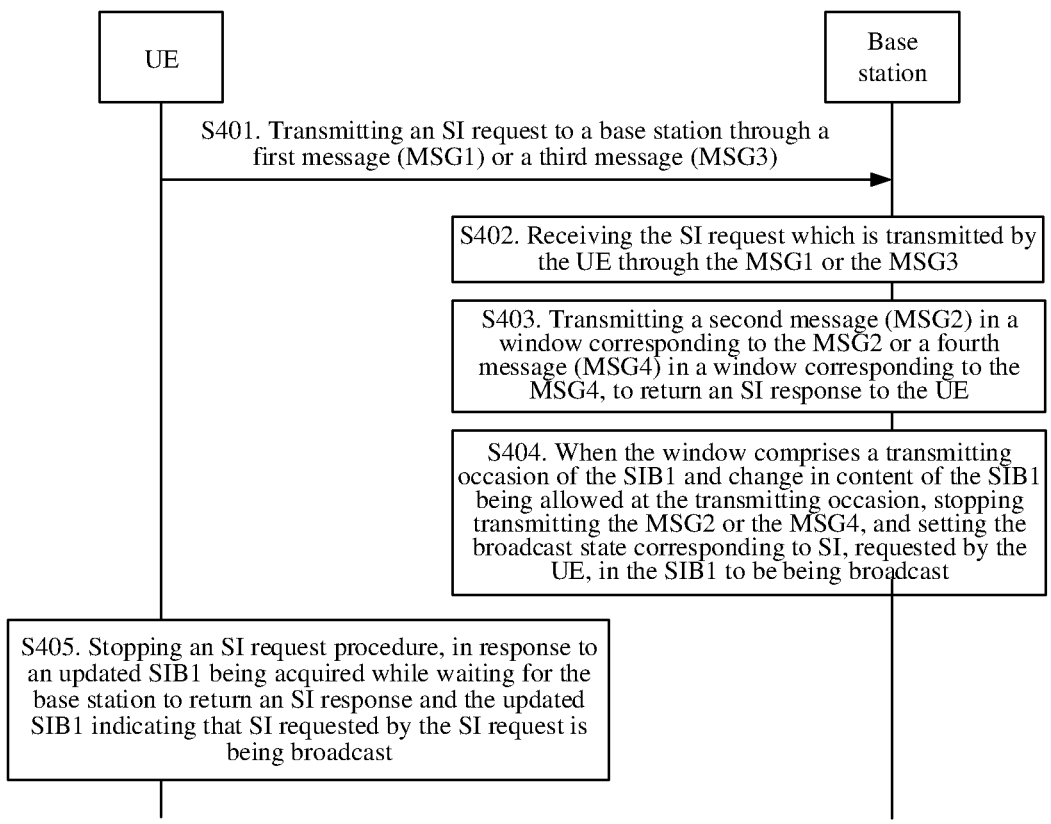
FIG. 4 is a signaling flow diagram of a method for stopping an SI request according to an exemplary embodiment of the present disclosure.

FIG. 4 is a signaling flow diagram of a method for stopping an SI request according to an exemplary embodiment of the present disclosure. The embodiment is described from the perspective of interaction between a base station and UE. As illustrated in FIG. 4, the method includes:

In step S401, the UE transmits an SI request to the base station through an MSG1 or an MSG3, in response to an SIB1 indicating that the SI to be acquired by the UE is not being broadcast.

In step S402, the base station receives the SI request which is transmitted by the UE through the MSG1 or the MSG3.

In step S403, the base station transmits an MSG2 in a window corresponding to the MSG2 or an MSG4 in a window corresponding to the MSG4, to return an SI response to the UE.

In step S404, in response to the window including a transmitting occasion of the SIB1 and change in the content of the SIB1 being allowed at the transmitting occasion, the base station stops transmitting the MSG2 or the MSG4, and sets the broadcast state corresponding to the SI, requested by the UE, in the SIB1 to being broadcast.

In step S405, the UE stops an SI request procedure, in response to an updated SIB1 being acquired while waiting for the base station to return an SI response and the updated SIB1 indicating that the SI requested by the SI request is being broadcast.

In the above embodiment, through interaction between the base station and the UE, the UE may terminate the SI request in advance, thereby reducing wasted UE power consumption and avoiding unnecessary operations.

Figure 5:
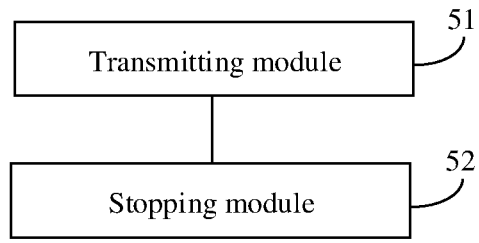
FIG. 5 is a block diagram of a device for stopping an SI request according to an exemplary embodiment of the present disclosure.

FIG. 5 is a block diagram of a device for stopping an SI request according to an exemplary embodiment of the present disclosure. The device may be located in UE. As illustrated in FIG. 5, the device includes a transmitting module 51 and a stopping module 52.

The transmitting module 51 is configured to transmit an SI request to a base station through a first message (MSG1) or a third message (MSG3), in response to a first system information block (SIB1) indicating that the SI to be acquired by the UE is not being broadcast.

The base station broadcasts the first type of system information (Minimum SI), the Minimum SI includes an MIB and a first system information block (SIB1). The SIB1 indicates the scheduling information of other system information such as an SIB2, an SIB3 and an SIB4, and the scheduling information may include information which indicates whether each SI of other system information is being broadcast. The UE may acquire from the Minimum SI which SI is scheduled by the base station and whether the SI is being broadcast.

The SI request may be transmitted to the base station through the MSG1 or the MSG3, if the UE determines that the SI to be acquired by the UE is not being broadcast according to the indication of the SIB1.

The stopping module 52 is configured to stop an SI request procedure, in response to an updated SIB1 being acquired during waiting for the base station to return an SI response corresponding to the SI request transmitted by the transmitting module 51 and the updated SIB1 indicating that the SI requested by the SI request is being broadcast.

After transmitting the SI request to the base station through the MSG1 or the MSG3, the UE waits to receive an MSG2 or an MSG4. The SI request procedure is stopped, if an updated SIB1 is acquired while waiting to receive the MSG2 or the MSG4 and the updated SIB1 indicates that the requested SI is being broadcast. Optionally, the SI request procedure is stopped, if the updated SIB1 indicates that all requested SI is being broadcast. The SI request procedure may be stopped in a plurality of manners, such as the following two manners.

In manner 1, an RRC layer transmits indication information to a MAC layer, and the indication information is configured to indicate the MAC layer to stop the random access which is initiated based on the current SI request. The MAC layer stops receiving the MSG2 or the MSG4 according to the indication information and stops the random access which is initiated based on the SI request.

In the embodiment, the MAC layer stops receiving the MSG2 or the MSG4 according to the indication information, which is considered that the random access is completed.

In manner 2, an RRC layer transmits indication information to a MAC layer, and the indication information is configured to indicate the MAC layer to stop the random access which is initiated based on the SI request. The MAC layer waits to receive the MSG2 or the MSG4 according to the indication information, and when the MSG2 or the MSG4 for the current UE is not successfully received, the SI request is not retransmitted through the MSG1 or the MSG3.

In the embodiment, the MAC layer no longer retransmits the SI request through the MSG1 or the MSG3, if the MSG2 or the MSG4 for the current UE is not successfully received, which is considered that the random access process is completed.

It can be seen that in the embodiment, the SI request procedure may be stopped in a plurality of manners, and the implementation manners are flexible and diverse.

In the above embodiment, the SI request is transmitted to the base station through the MSG1 or the MSG3, if the SIB1 indicates that the SI to be acquired by the UE is not being broadcast. The SI request procedure is stopped, if an updated SIB1 is acquired while waiting for the base station to return an SI response and the updated SIB1 indicates that the requested SI is being broadcast, so as to terminate the SI request in advance, thereby reducing wasted UE power consumption and avoiding unnecessary operations.

Figure 6:
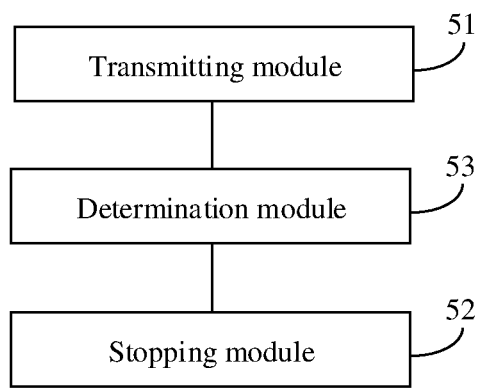
FIG. 6 is a block diagram of another device for stopping an SI request according to an exemplary embodiment of the present disclosure.

FIG. 6 is a block diagram of another device for stopping SI request according to an exemplary embodiment. As illustrated in FIG. 6, based on the embodiment illustrated in FIG. 5, the device may further include a determination module 53.

The determination module 53 is configured to determine, before the stopping module 51 stops the SI request procedure, that an SI window corresponding to the requested SI exists before the end time of the current SI modification period.

In the embodiment, UE further determines whether the SI window corresponding to the requested SI exists before the end time of the current SI modification period. If the SI window exists, the SI request procedure is stopped. For example, it is also necessary to determine that SI windows corresponding to all requested SI exist within the current SI modification period.

In the above embodiment, whether the SI window corresponding to the requested SI exists before the end time of the current SI modification period is determined. When the SI window corresponding to the requested SI exists before the end time of the current SI modification period, the SI request procedure is stopped, if an updated SIB1 is acquired while waiting for the base station to return an SI response and the updated SIB1 indicates that the requested SI is being broadcast, so as to terminate the SI request in advance, thereby reducing wasted UE power consumption and avoiding unnecessary operations.

Figure 7:
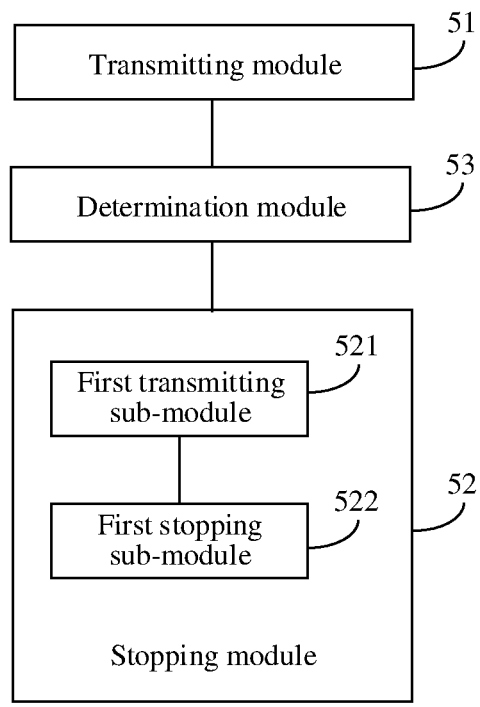
FIG. 7 is a block diagram of another device for stopping an SI request according to an exemplary embodiment of the present disclosure.

FIG. 7 is a block diagram of another device for stopping SI request according to an exemplary embodiment. As illustrated in FIG. 7, based on the embodiment illustrated in FIG. 5 or FIG. 6, the stopping module 52 may include a first transmitting sub-module 521 and a first stopping sub-module 522.

The first transmitting sub-module 521 is configured to transmit indication information to a MAC layer, and the indication information is configured to indicate the MAC layer to stop the random access which is initiated according to the SI request.

The first stopping sub-module 522 is configured to stop receiving of a second message (MSG2) or a fourth message (MSG4) according to the indication information transmitted by the first transmitting sub-module 521 and end the random access which is initiated according to the SI request.

The first transmitting sub-module 521 is located in the RRC layer, and the first stopping sub-module 522 is located in the MAC layer.

In the embodiment, the first stopping sub-module 522 located in the MAC layer stops receiving the MSG2 or the MSG4 according to the indication information, which is considered that the random access is completed.

In the above embodiment, the SI request procedure may be stopped in a plurality of manners, and the implementation manners are flexible and diverse.

Figure 8:
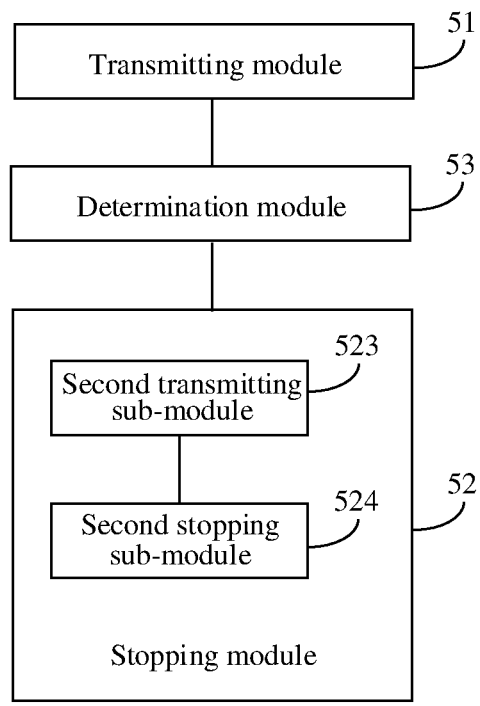
FIG. 8 is a block diagram of another device for stopping an SI request according to an exemplary embodiment of the present disclosure.

FIG. 8 is a block diagram of another device for stopping an SI request according to an exemplary embodiment. As illustrated in FIG. 8, based on the embodiment illustrated in FIG. 5 or FIG. 6, the stopping module 52 may include a second transmitting sub-module 523 and a second stopping sub-module 524.

The second transmitting sub-module 523 is configured to transmit indication information to a MAC layer, and the indication information is configured to indicate the MAC layer to end the random access which is initiated according to the SI request.

The second stopping sub-module 524 is configured to wait to receive an MSG2 or an MSG4 according to the indication information transmitted by the second transmitting sub-module 523, and in response to failing to receive the MSG2 or the MSG4 for the current UE, not retransmit the SI request through an MSG1 or an MSG3.

The second transmitting sub-module 523 is located in the RRC layer, and the second stopping sub-module 524 is located in the MAC layer.

In the embodiment, if the MSG2 or the MSG4 for the current UE is not successfully received, the second stopping sub-module 524 located in the MAC layer no longer retransmits the SI request through an MSG1 or an MSG3, which is considered that the random access process is completed.

In the above embodiment, the SI request procedure may be stopped in a plurality of manners, and the implementation manners are flexible and diverse.

Figure 9:
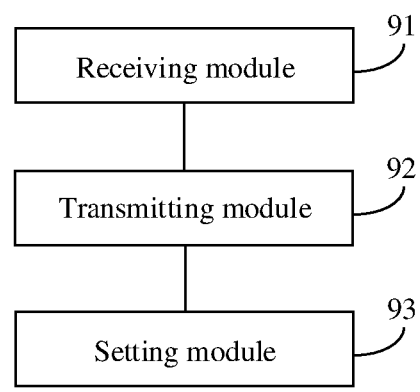
FIG. 9 is a block diagram of a further device for stopping an SI request according to an exemplary embodiment.

FIG. 9 is a block diagram of a further device for stopping SI request according to an exemplary embodiment. The device may be located in a base station. As illustrated in FIG. 9, the device includes a receiving module 91, a transmitting module 92 and a setting module 93.

The receiving module 91 is configured to receive an SI request which is transmitted by UE through a first message (MSG1) or a third message (MSG3).

The transmitting module 92 is configured to transmit an MSG2 in a window corresponding to the MSG2 or transmit an MSG4 in a window corresponding to the MSG4, to return an SI response corresponding to the SI request received by the receiving module 91 to the UE.

The setting module 93 is configured to, when the target parameter including the window meets the preset condition, stop transmitting the MSG2 or the MSG4, and set the broadcast state corresponding to the SI, requested by the UE, in the SIB1 to being broadcast.

The target parameter may include, but is not limited to, the window corresponding to the MSG2 or the MSG4.

In the embodiment, the target parameter meets the preset condition may include that: the window corresponding to the MSG2 or the MSG4 includes a transmitting occasion of the SIB1, and change in the content of the SIB1 is allowed at the transmitting occasion. Or the target parameter meets the preset condition may include that: the window corresponding to the MSG2 or the MSG4 includes a transmitting occasion of the SIB1, change in the content of the SIB1 is allowed at the transmitting occasion, and an SI window corresponding to the requested SI exists within the current SI modification period.

In the embodiment, when the target parameter meets the preset condition, the base station may not transmit the MSG2 or the MSG4 for the above SI request, and directly sets the broadcast state corresponding to the SI, requested by the UE, in the SIB1 to being broadcast.

In the above embodiment, if the target parameter meets the preset condition, the MSG2 or the MSG4 is stopped from being transmitted, and the broadcast state corresponding to the SI requested by the UE in the SIB1 is set to being broadcast, so that the UE may know that the requested SI is being broadcast according to the SIB1, so as to terminate the SI request in advance, thereby reducing wasted UE power consumption and avoiding unnecessary operations.

Figure 10:
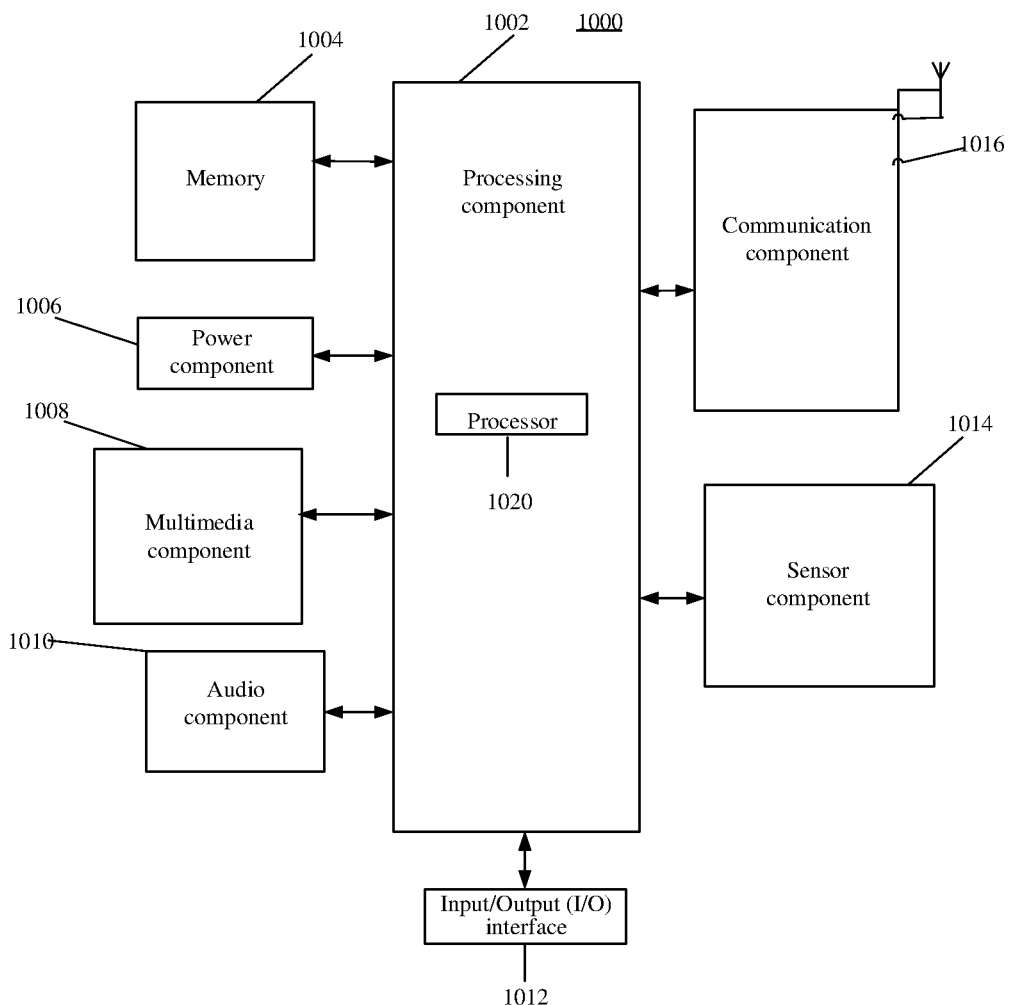
FIG. 10 is a block diagram of a device applicable to stop an SI request according to an exemplary embodiment.

FIG. 10 is a block diagram of a device applicable to stop an SI request according to an exemplary embodiment. For example, a device 1000 may be user equipment, such as a mobile phone, a computer, a digital broadcast terminal, messaging equipment, a gaming console, tablet equipment, medical equipment, exercise equipment, a personal digital assistant, and the like.

Referring to FIG. 10, the device 1000 may include one or more of the following components: a processing component 1002, a memory 1004, a power component 1006, a multimedia component 1008, an audio component 1010, an Input/Output (I/O) interface 1012, a sensor component 1014 and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

One of the processors 1020 in the processing component 1002 may be configured to:

transmit an SI request to a base station through a first message (MSG1) or a third message (MSG3), if a first system information block (SIB1) indicates that SI to be acquired by the UE is not being broadcast; and stop an SI request procedure, if an updated SIB1 is acquired while waiting for the base station to return an SI response and the updated SIB1 indicates that SI requested by the SI request is being broadcast.

The memory 1004 is configured to store various types of data to support the operation of the device 1000. Examples of such data include instructions for any application program or method operated on the device 1000, contact data, phone book data, messages, pictures, videos, and the like. The memory 1004 may be implemented by any type of volatile or non-volatile storage devices or a combination thereof, such as a Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1006 provides power for various components of the device 1000. The power component 1006 may include a power management system, one or more power supplies, and other components which are associated with generating, managing, and distributing power for the device 1000.

The multimedia component 1008 includes a screen which provides an output interface between the device 1000 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 1008 includes a front camera and/or a rear camera. The front camera and the rear camera may receive external multimedia data while the device 1000 is in an operation mode, such as a photographing mode or a video mode. Each front camera and each rear camera may be fixed optical lens systems, or may have focal lengths and optical zoom capabilities.

The audio component 1010 is configured to output and/or input audio signals. For example, the audio component 1010 includes a microphone (MIC), and the microphone is configured to receive external audio signals when the device 1000 is in an operation mode, such as a calling mode, a recording mode, and a voice identification mode. The received audio signals may be further stored in the memory 1004 or transmitted via the communication component 1016. In some embodiments, the audio component 1010 may further include a speaker to output audio signals.

The I/O interface 1012 provides an interface between the processing component 1002 and peripheral interface modules, which may be keyboards, click wheels, buttons, etc.

These buttons may include, but not limited to, a home button, a volume button, a start button, and a lock button.

The sensor component 1014 includes one or more sensors configured to provide various aspects of state assessment for the device 1000. For example, the sensor component 1014 may detect an on/off state of the device 1000, and relative positioning of components. For example, the components are a display and a keypad of the device 1000. The sensor component 1014 may also detect a change in position of the device 1000 or a component of the device 1000, presence or absence of user contact with the device 1000, an orientation or an acceleration/deceleration of the device 1000, and a change in temperature of the device 1000. The sensor component 1014 may include a proximity sensor configured to detect the presence of objects nearby without any physical contact. The sensor component 1014 may also include light sensors, such as CMOS or CCD image sensors, for use in imaging applications. In some embodiments, the sensor component 1014 may also include an acceleration sensor, a gyroscope sensor, a magnetic sensor, a pressure sensor, or a temperature sensor.

The communication component 1016 is configured to facilitate wired or wireless communications between the device 1000 and other devices. The device 1000 may access a wireless network based on a communication standard, such as WiFi, 2G or 3G, or a combination thereof. In an exemplary embodiment, the communication component 1016 receives a broadcast signal or broadcast related information from an external broadcast management system via a broadcast channel. In an exemplary embodiment, the communication component 1016 further includes a Near Field Communication (NFC) module to promote short-range communications. For example, the NFC module may be implemented based on a Radio Frequency Identification (RFID) technology, an Infrared Data Association (IrDA) an Ultra-Wide Band (UWB) technology, a Bluetooth (BT) technology and other technologies.

In exemplary embodiments, the device 1000 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In exemplary embodiments, a non-transitory computer-readable storage medium including an instruction, such as a memory 1004 including an instruction, is further provided. The instruction may be executed by a processor 1020 of the device 1000 to complete the above method. For example, the non-transitory computer readable storage medium may be a Read Only Memory (ROM), a Random Access Memory (RAM), a CD-ROM, a magnetic tape, a floppy disc, an optical data storage device, and the like.

Figure 11:
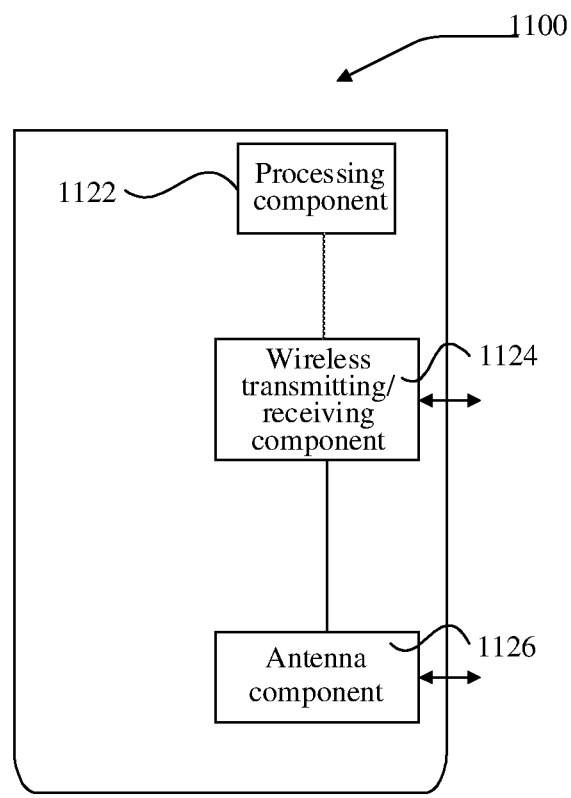
FIG. 11 is a block diagram of another device applicable to stop an SI request according to an exemplary embodiment.

FIG. 11 is a block diagram of another device applicable to stop an SI request according to an exemplary embodiment. The device 1100 may be provided as a base station. Referring to FIG. 11, the device 1100 includes a processing component 1122, a wireless transmitting/receiving component 1124, an antenna component 1126 and a signal processing part specific to a wireless interface. The processing component 1122 may further include one or more processors.

One of the processors in the processing component 1122 may be configured to:

receive an SI request which is transmitted by UE through a first message (MSG1) or a third message (MSG3);

transmit a second message (MSG2) in a window corresponding to the MSG2 or a fourth message (MSG4) in a window corresponding to the MSG4, to return an SI response to the UE; and when a target parameter including the window meets a preset condition, stop transmitting the MSG2 or the MSG4, and set the broadcast state corresponding to SI, requested by the UE, in the SIB1 to being broadcast.

In exemplary embodiments, there is further provided a non-transitory computer readable storage medium including instructions. The above instructions may be executed by the processing component 1122 of the device 1100 to implement the above method for stopping SI request. For example, the non-transitory computer readable storage medium may be a Read Only Memory (ROM), a Random Access Memory (RAM), a CD-ROM, a magnetic tape, a floppy disc, an optical data storage device, and the like.

For the device embodiments, since they substantially correspond to the method embodiments, reference can be made to the part of the description of the method embodiments. The device embodiments described above are merely illustrative, in that units illustrated as separate elements may or may not be physically separate, and in that elements shown as units may or may not be physical units, i.e., may be located at one place, or may be distributed on a plurality of network units. Some or all of the modules can be selected according to actual needs to achieve the purpose of the scheme of the embodiments. Those ordinarily skilled in the art would understand and practice without involving any inventive effort.

It should be noted that in this document, relational terms such as first and second, and the like are used solely to distinguish one entity or operation from another entity or operation without necessarily requiring or implying any such actual relationship or order between such entities or operations. The terms "including", "comprising", or any other variations thereof, are intended to cover a non-exclusive inclusion, such that a process, method, article, or equipment that includes a list of elements not only includes those elements but also may include other elements not expressly listed or inherent to such process, method, article, or equipment. Under the condition of no more limitations, an element defined by statement "including a/an" does not exclude existence of another element that is the same in a process, method, article, or equipment including the element.

Other embodiments of the disclosure will readily occur to those skilled in the art upon consideration of the specification and practice of the disclosure disclosed herein. The present disclosure is intended to cover any variation, use or adaptation of the disclosure, which follows the general principles of the disclosure and includes common knowledge or conventional technical means in the technical field not disclosed in the disclosure. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A method for stopping a system information (SI) request, applied to user equipment (UE) and comprising:

transmitting an SI request to a base station through a first message (MSG1) or a third message (MSG3), in response to a first system information block (SIB1) indicating that SI to be acquired by the UE is not being broadcast; and stopping an SI request procedure, in response to an updated SIB1 being acquired while waiting for the base station to return an SI response and the updated SIB1 indicating that SI requested by the SI request is being broadcast.

2. The method of claim 1, wherein the method further comprises:
determining, before stopping the SI request procedure, that an SI window corresponding to the requested SI exists before an end time of a current SI modification period.

3. The method of claim 2, wherein determining, before stopping the SI request procedure, that the SI window corresponding to the requested SI exists before the end time of the current SI modification period comprises:
determining that SI windows corresponding to all requested SI exist within the current SI modification period.

4. The method of claim 1, wherein stopping the SI request procedure in response to the updated SIB1 indicating that the requested SI is being broadcast comprises:
stopping the SI request procedure in response to the updated SIB1 indicating that all requested SI is being broadcast.

5. The method of claim 1, wherein stopping the SI request procedure comprises:
transmitting, by a Radio Resource Control (RRC) layer, indication information to a Media Access Control (MAC) layer, wherein the indication information is configured to indicate the MAC layer to stop a random access initiated according to the SI request; and
stopping, by the MAC layer, receiving of a second message (MSG2) or a fourth message (MSG4) according to the indication information, and stopping, by the MAC layer, the random access initiated according to the SI request.

6. The method of claim 1, wherein stopping the SI request procedure comprises:
transmitting, by an RRC layer, indication information to a MAC layer, wherein the indication information is configured to indicate the MAC layer to end a random access initiated according to the SI request; and
waiting, by the MAC layer, to receive an MSG2 or an MSG4 according to the indication information, and in response to failing to receive the MSG2 or the MSG4 for the UE, not retransmitting the SI request through the MSG1 or the MSG3.

7. A method for stopping a system information (SI) request, applied to a base station and comprising:
receiving an SI request transmitted by user equipment (UE) through a first message (MSG1) or a third message (MSG3);
transmitting a second message (MSG2) in a window corresponding to the MSG2 or a fourth message (MSG4) in a window corresponding to the MSG4, to return an SI response to the UE; and
when a target parameter comprising the window meets a preset condition, stopping transmitting the MSG2 or the MSG4, and setting a broadcast state corresponding to SI, requested by the UE, in a first system information block (SIB1) to being broadcast.

8. The method of claim 7, wherein the target parameter comprising the window meets the preset condition comprises one of:
the window comprising a transmitting occasion of the SIB1, and change in content of the SIB1 being allowed at the transmitting occasion; or
the window comprising a transmitting occasion of the SIB1, change in the content of the SIB1 being allowed at the transmitting occasion, and an SI window corresponding to the requested SI existing within the current SI modification period.

9. User equipment (UE), comprising:
a processor; and
a memory configured to store instructions executable by the processor,
wherein the processor is configured to:
transmit a system information (SI) request to a base station through a first message (MSG1) or a third message (MSG3), in response to a first system information block (SIB1) indicating that SI to be acquired by the UE is not being broadcast; and
stop an SI request procedure, in response to an updated SIB1 being acquired while waiting for the base station to return an SI response corresponding to the SI request and the updated SIB1 indicating that SI requested by the SI request is being broadcast.

10. The UE of claim 9, wherein the processor is further configured to:
determine, before stopping the SI request procedure, that an SI window corresponding to the requested SI exists before an end time of a current SI modification period.

11. The UE of claim 10, wherein the processor is further configured to:
determine that SI windows corresponding to all requested SI exist within the current SI modification period.

12. The UE of claim 9, wherein the processor is further configured to:
stop the SI request procedure in response to the updated SIB1 indicating that all requested SI is being broadcast.

13. The UE of claim 9, wherein the processor is further configured to:
transmit indication information to a Media Access Control (MAC) layer, wherein the indication information is configured to indicate the MAC layer to stop a random access initiated according to the SI request; and
stop receiving of a second message (MSG2) or a fourth message (MSG4) according to the indication information, and stop the random access initiated according to the SI request.

14. The UE of claim 9, wherein the processor is further configured to:
transmit indication information to a MAC layer, wherein the indication information is configured to indicate the MAC layer to end a random access initiated according to the SI request; and
wait to receive an MSG2 or an MSG4 according to the indication information, and in response to failing to receive the MSG2 or the MSG4 for the UE, not retransmit the SI request through the MSG1 or the MSG3.

15. A base station, comprising:
a processor; and
a memory configured to store instructions executable by the processor, wherein the processor is configured to perform the method of claim 7.

* * * * *